United States Patent [19]
Russell

[11] Patent Number: 6,017,096
[45] Date of Patent: Jan. 25, 2000

[54] WHEEL COVER POSITIONING SYSTEM

[75] Inventor: Martin E. Russell, Nashville, Tenn.

[73] Assignee: Del-Met Corporation, Nashville, Tenn.

[21] Appl. No.: 09/027,814

[22] Filed: Feb. 23, 1998

[51] Int. Cl.[7] .................................................. B60B 7/08
[52] U.S. Cl. ..................................... 301/37.36; 301/37.37
[58] Field of Search ............................... 301/37.1, 37.31, 301/37.35, 37.36, 37.37, 37.42

[56]           References Cited

U.S. PATENT DOCUMENTS

| | | |
|---|---|---|
| 2,967,736 | 1/1961 | Lyon . |
| 3,876,257 | 4/1975 | Buerger . |
| 4,027,919 | 6/1977 | Foster ................................ 301/37.42 X |
| 4,146,273 | 3/1979 | Spisak . |
| 4,361,359 | 11/1982 | Binnewies . |
| 4,427,238 | 1/1984 | Connell . |
| 4,740,038 | 4/1988 | Okano . |
| 4,884,851 | 12/1989 | Hempelmann . |
| 4,895,415 | 1/1990 | Stay . |
| 4,917,441 | 4/1990 | Iida ....................................... 301/37.36 |
| 4,991,909 | 2/1991 | Hamada ................................ 301/37.36 |
| 4,998,780 | 3/1991 | Eshler et al. .......................... 301/37.37 |
| 5,222,785 | 6/1993 | Green . |
| 5,346,288 | 9/1994 | Hodge et al. .......................... 301/37.37 |
| 5,364,172 | 11/1994 | Sopko et al. ...................... 301/37.37 X |
| 5,542,751 | 8/1996 | Russell . |

FOREIGN PATENT DOCUMENTS

| | | | |
|---|---|---|---|
| 3704384 | 8/1988 | Germany ............................. 301/37.37 |
| 63-176701 | 7/1988 | Japan .................................. 301/37.37 |

*Primary Examiner*—Russell D. Stormer
*Attorney, Agent, or Firm*—Natter & Natter

[57]                ABSTRACT

A wheel cover positioning system for a wheel having a disc and a rim includes a plurality of standoff legs equidistantly spaced about a circle coaxial with the wheel cover and the wheel. The legs extend axially toward the wheel and engage the wheel rim at a flex free rigid hub positioned radially inwardly of a tire seat portion of the rim. The legs may be positioned to also engage a radially outer face of the disc adjacent the juncture between the disc and the rim. Appropriate clearance between the wheel cover and the peripheral edge of the wheel rim is thus provided for avoiding abutment between these surfaces and squeaking noises generated by flex movement of the tire seat portion of the rim relative to the wheel cover.

19 Claims, 3 Drawing Sheets

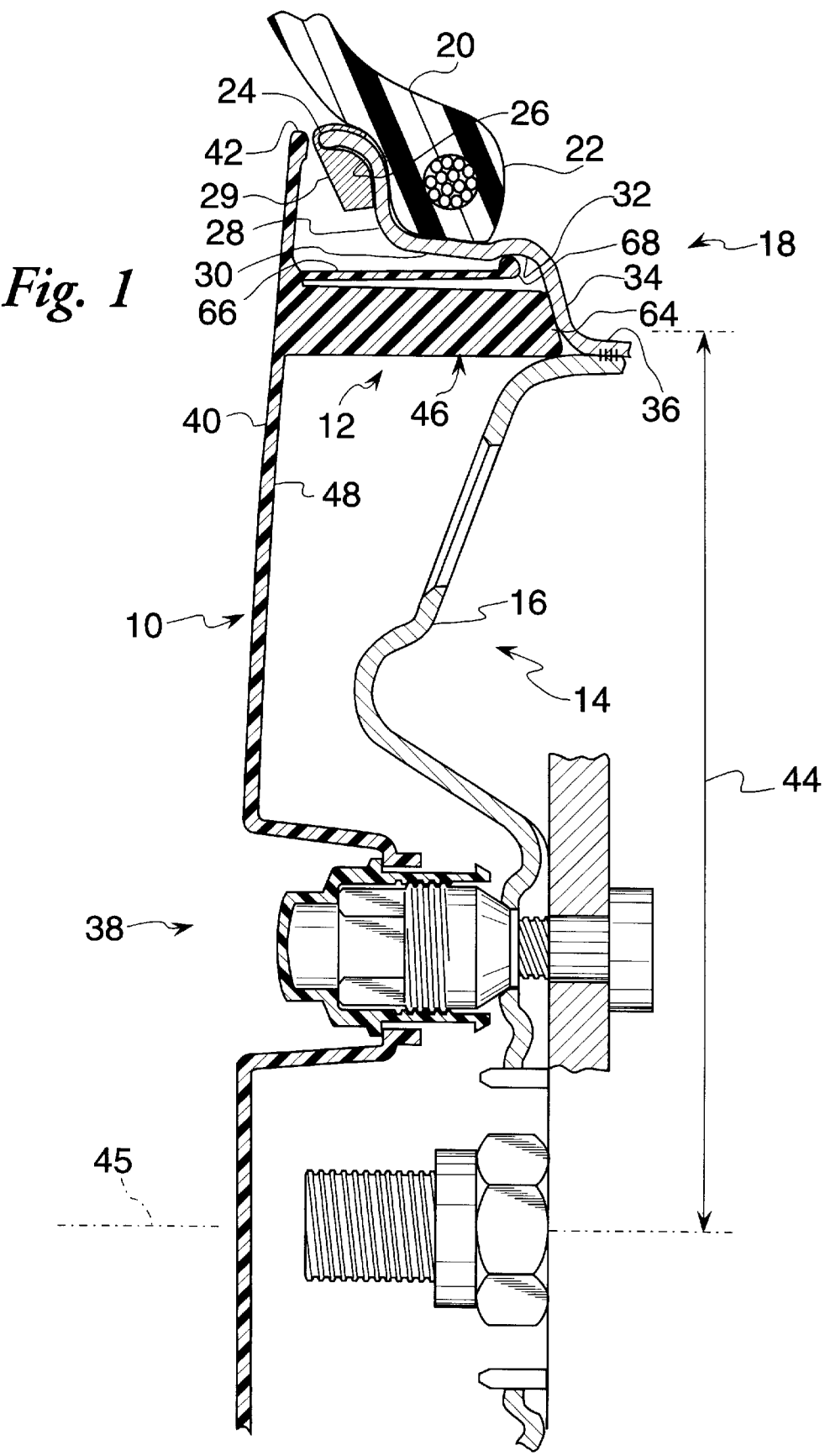

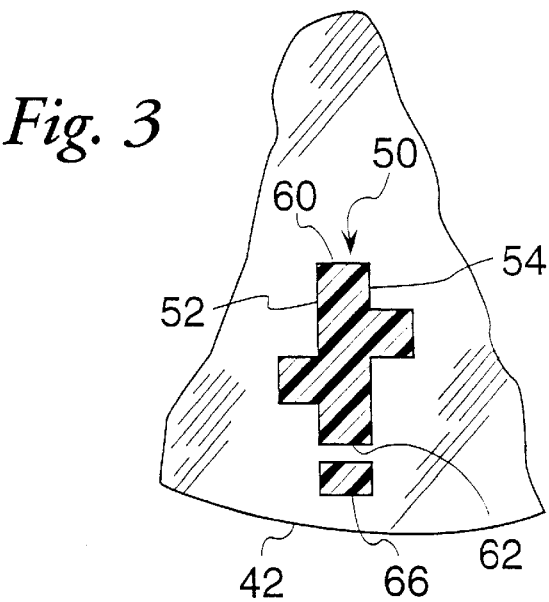
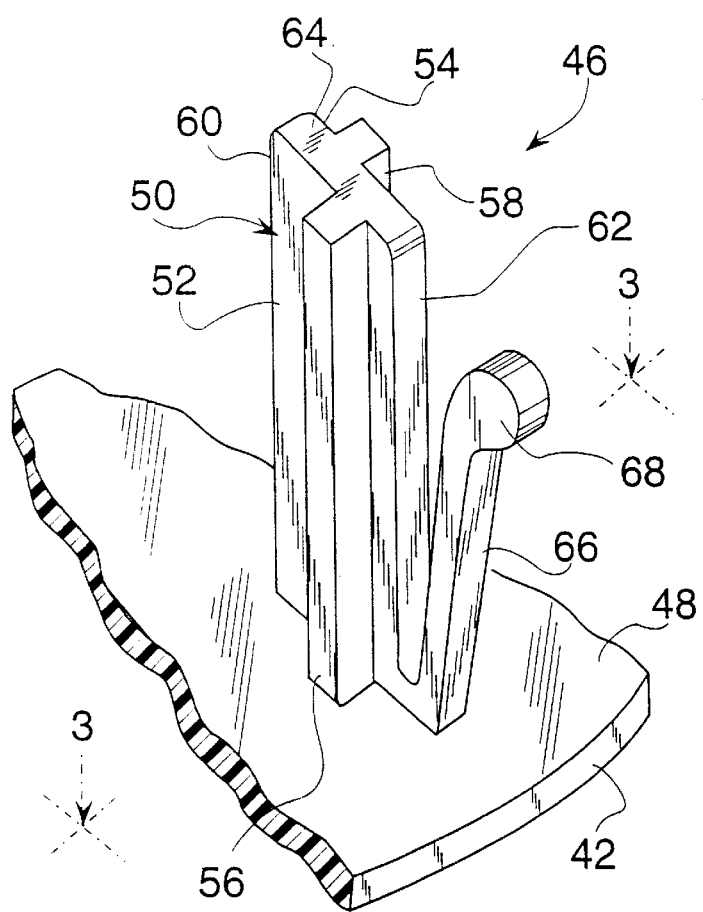

WHEEL COVER POSITIONING SYSTEM

BACKGROUND OF THE INVENTION

1. Field of the Invention

This invention relates generally to wheel trim and more particularly to a system for providing clearance between a wheel cover and a wheel rim.

2. Antecedents of the Invention

Enhanced wheel appearance, not only in automobile wheels but, in addition, wheels of sport utility vehicles and trucks has been a continuing objective in both original equipment manufacturing and aftermarket industries.

While steel wheels have been the cost and weight efficient approach at providing requisite strength and utility, the appearance of stock steel wheels left much to be desired from an aesthetic standpoint. In automotive applications, manufacturers constantly strove to meet fuel efficiency goals while at the same time, sought to provide attractive appearance at low cost. Automotive manufacturers attempts at achieving such objectives resulted in steel wheels to which light weight plastic wheel covers were mounted. The plastic wheel covers were generally injected molded and a variety of surface coatings were applied to the outer face of the wheel cover.

As optional equipment in economy vehicles and standard equipment in luxury vehicles, original equipment manufacturers offered cast alloy wheels which did not require wheel covers. The costs of cast alloy wheels, however, was significant; such wheels were generally not selected as an option by cost conscious consumers. Aftermarket manufacturers offered replacement wheel covers, chromed or plated steel wheels as well as cast alloy wheels.

Various systems have been devised for mounting wheel covers to vehicle wheels. Mounting or retention systems employed retentive forces between the wheel cover and the wheel which were applied either in radial or axial directions.

In some radial retention systems, as exemplified by U.S. Pat. No. 4,232,907, sharp teeth or barbs on a plurality of metal spring leaves engaged a wheel rim. The spring leaves were individually mounted to the wheel cover or comprised part of a metal grip ring which was received within an annular channel on the inner face of a wheel cover, as illustrated in U.S. Pat. No. 3,876,257, owned by the assignee of the present invention.

Radial retention systems suffered from certain disadvantages, among which were that the sharp barbs were prone to scratch protective paint coatings from the surface of the wheel rim, exposing the rim to moisture and road salts, which accelerated corrosion. Also, stresses were generated within the body of the wheel cover by the engagement between the springs and the wheel rim. With respect to plastic wheel covers, such stresses often resulted in cracks or other failures. Further, due to the elevated temperatures generated by the vehicle braking system components, tire flex, etc. plastic wheel covers often attained elevated temperatures which degraded structural rigidity, resulting in distortion of the wheel covers, reduction in retentive forces and consequent loss of wheel covers.

Attempts to avoid scratching of paint in radial retention systems resulted in the employment on non-scratch leaf springs, as illustrated by U.S. Pat. No. 5,542,751, assigned to the assignee of the present invention and the utilization of spring wire rings carried in struts and employed to outwardly bias engagement elements to seat in a concave draw bead step of the wheel rim, as exemplified by U.S. Pat. No. 4,740,038.

Axial wheel cover retention systems have employed threaded caps to engage wheel mounting lugs projecting beyond the ends of lug nuts, as illustrated in U.S. Pat. No. 4,895,415 and U.S. Pat. No. 5,222,785. The caps were tightened against the end of the lug nut, compressing the wheel cover between the lug nut and the cap.

Many retention systems positioned the periphery of the wheel cover in abutment with the peripheral edge of the wheel rim. Such abutting contact often resulted in axial outward flexing of the periphery of the wheel cover. The engagement between the wheel cover and the periphery of the wheel rim also resulted in rubbing contact and the generation of squeaking noises when the wheel rim moved relative to the wheel cover, e.g., when the wheel rim flexed.

While a need for spacing wheel covers from the periphery of the wheel rim was previously perceived, it was for a different objective, i.e. to provide an adequate clearance for the insertion of a screwdriver to pry the wheel cover loose, as disclosed in U.S. Pat. No. 4,427,238. In U.S. Pat. No. 4,427,238, a plurality of flanges having shoulders which engaged a wheel weight channel portion of the wheel rim provided the screwdriver clearance.

A tire was mounted to a wheel rim with its annular tire bead circumscribing a tire bead seat zone comprising portions of the rim between the peripheral edge of the wheel rim and a draw bead step. The tire bead seat zone was subject to flex during road engagement whereas the wheel cover was not subject to such flex. Abutting engagement between the locating stops and the wheel weight channel did not prevent the generation of squeaking noises upon relative movement between the two surfaces in engagement. U.S. Pat. No. 4,427,238 did not address the problem perceived by the inventor herein.

One of the drawbacks associated with the utilization of flanges in engagement with the wheel weight channel of a wheel rim was that the position of the wheel cover, hence the position of the flanges, was fixed relative to the wheel by a valve stem cut out in the wheel cover. The position of wheel weights carried within the wheel weight channel was variable, however, being dependent upon the requisites for balancing the entire wheel and tire assembly. Often, the flanges would not be able to seat against the channel because of interference with the wheel weights.

It has also been known to employ flanges on the inner face of a wheel cover for the purpose of centering the wheel cover to be coaxial with the wheel, as illustrated in U.S. Pat. Nos. 4,884,851, 4,146,273 and 3,867,257. Since such arrangements provided abutting contact between the flange portions of the wheel cover and a convex inner shoulder of the wheel weight channel and the inner shoulder of the wheel weight channel was subject to flex; squeaking noises were not alleviated.

In addition, the flexing of portions of the inner shoulder resulted in the wheel cover being moved axially outwardly from the wheel, further increasing the stresses applied to the wheel cover, potentially loosening the wheel cover retention and increasing the likelihood for the wheel cover to be thrown off during operation of the vehicle.

SUMMARY OF THE INVENTION

A positioning system for a wheel cover assures adequate clearance between the inner face of the wheel cover and the peripheral edge of a wheel rim. The system includes a plurality of axial standoff legs equidistantly spaced about a circle coaxial with the wheel cover and the wheel.

The standoff legs are of a length sufficient to abut a flex free rigid hub of the wheel rim with the hub being positioned radially and axially inwardly of a draw bead step formed in the Each leg comprises an elongate trunk having parallel planar sides and a distal end which is contoured to conform to the shape of the hub surface against which it abuts. Elongate axial ribs project transversely from opposite sides of the trunk for reinforcement against deflection. Radial direction may be precluded by abutment of a radially inner edge of the trunk against a central disc portion of the wheel.

From the foregoing compendium, it will be appreciated that it is an aspect of the present invention to provide a wheel cover positioning system of the general character described which is not subject to the disadvantages of the antecedents of the invention aforementioned.

A feature of the present invention is to provide a wheel cover positioning system of the general character described which assures that contact engagement surfaces in axial engagement between a wheel and a wheel cover mounted thereon are in areas wherein there is no relative movement therebetween.

A consideration of the present invention is to provide a wheel cover positioning system of the general character described which is simple to use, not requiring skills beyond the capacity of the average motorist.

Another aspect of the present invention is to provide a wheel cover positioning system of the general character described which is low in cost and well suited for economical mass production fabrication.

To provide a wheel cover positioning system of the general character described which precludes wear on wheel cover surfaces facing a wheel is a further feature of the present invention.

Another consideration of the present invention is to provide a wheel cover positioning system of the general character described which eliminates squeaking noises which ordinarily accompany abutting engagement between wheel covers and wheel rims.

Another feature of the present invention is to provide a wheel cover positioning system of the general character described which assures adequate clearance between a wheel cover and the peripheral edge of a wheel rim over the complete range of axial tolerance limits of a wheel.

To provide a wheel cover positioning system of the general character described which does not interfere with and accommodates conventional wheel weights mounted to a wheel rim is a further consideration of the present invention.

Yet an additional aspect of the present invention is to provide a wheel cover positioning system of the general character described which is free of contact with wheel weights carried in a wheel weight channel portion of a wheel rim.

Yet another feature of the present invention is to provide a wheel cover positioning system of the general character described which may be integrally formed of one piece construction with a molded wheel cover.

Other aspects, features and considerations of the present invention in part will be obvious and in part will be pointed out hereinafter.

With these ends in view, the invention finds embodiment in the various combinations of elements, arrangements of parts and series of steps by which the said aspects, features and consideration are attained all with reference to the accompanying drawing and the scope of which will be more particularly pointed out and indicated in the appended claims.

BRIEF DESCRIPTION OF THE DRAWINGS

In the accompanying drawings in which are shown some of the various possible exemplary embodiments of the invention, FIG. 1 is a fragmentary sectional view through a wheel carrying a tire and with a wheel cover being mounted to the wheel, the wheel cover having a wheel cover positioning system constructed in accordance with and embodying the invention;

FIG. 2 is a fragmentary perspective view of an inner face of the wheel cover and showing an axial standoff leg constructed in accordance with and embodying the invention;

FIG. 3 is a sectional view through the standoff leg and an adjacent assembly finger, the same being taken substantially along the plane 3—3 of FIG. 2.

DESCRIPTION OF THE PREFERRED EMBODIMENTS

Figure 4:
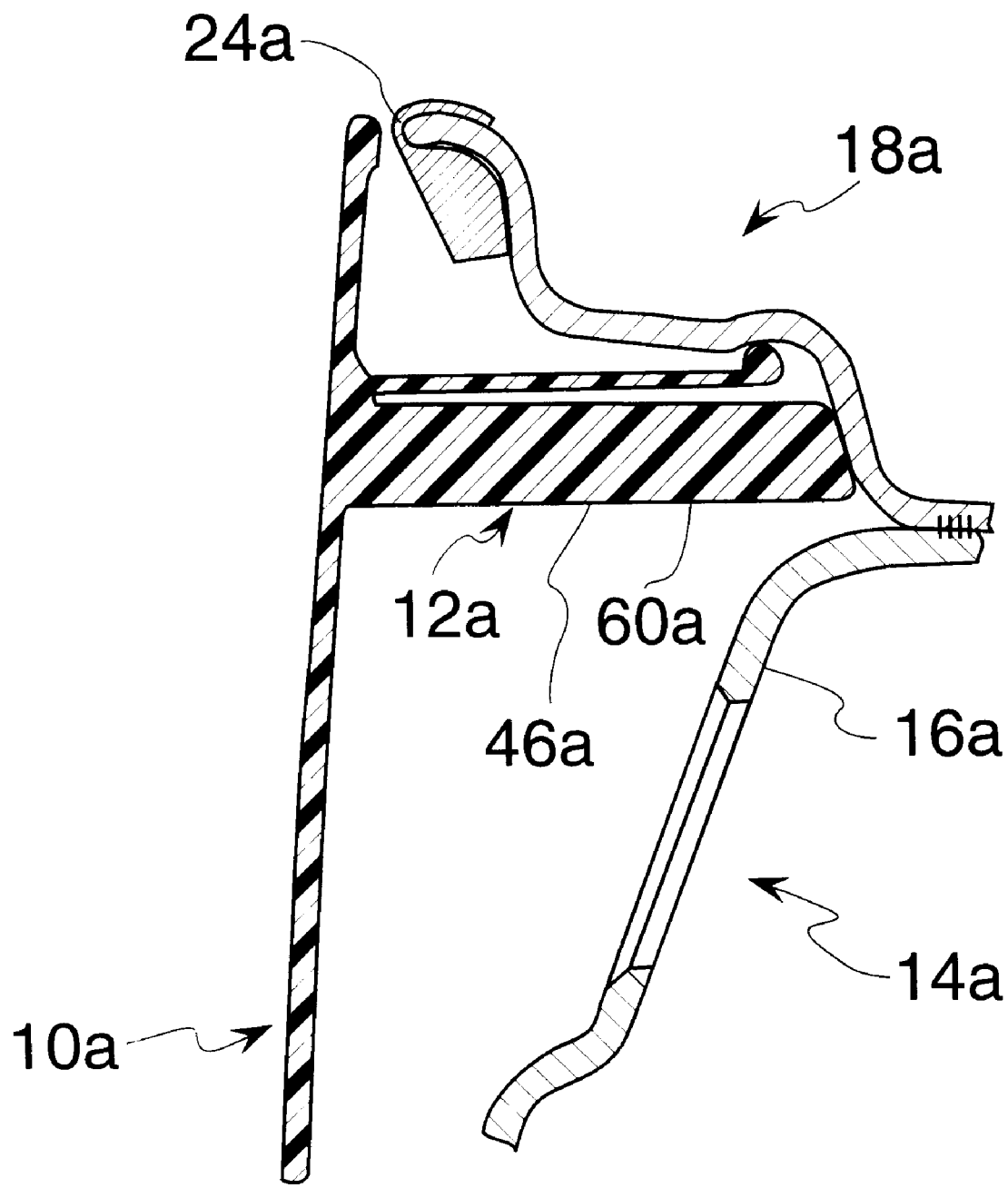
FIG. 4 is an axial sectional view of an alternate embodiment of the invention wherein the standoff leg is positioned for abutting engagement only against a hub portion of the wheel rim.

Referring now in detail to the drawings, the reference numeral 10 denotes generally a wheel cover having a positioning system 12 constructed in accordance with and embodying the invention. The wheel cover is illustrated, in FIG. 1, as being mounted to a steel wheel 14 of conventional configuration. The wheel 14 includes a central wheel disc 16 having lug apertures for mounting the wheel to a vehicle. Surrounding the disc 16 is a wheel rim 18 which carries a vehicle tire 20 having a tire mounting bead 22.

The rim 18 includes a peripheral edge lip 24 at the axially outermost surface of the wheel. The peripheral lip 24 defines the outer edge of a concave wheel weight channel 26 with the wheel weight channel being further defined at its radially inner end by a convex shoulder 28. A conventional wheel weight 29 may be carried in the wheel weight channel.

From the shoulder 28, the rim 18 extends in a generally axial direction through a sloped cylindrical span 30, with the span 30 terminating at a concave annular draw bead step or safety hump 32.

It should be noted that the axially exterior surface of the rim from the peripheral edge lip 24, through the wheel weight channel 26, the convex shoulder 28, the sloped cylindrical span 30 and the draw bead step 32 comprises a tire bead seat which carries the tire mounting bead 22. The seat portion of the rim carries the vehicle weight and road shocks as well as tire mounting and inflation stresses. Accordingly, the seat is subject to flex during operation of the vehicle to which the wheel 14 is mounted.

From the convex draw bead step 32, the wheel rim includes an annular hub portion 34 which extends radially and axially inwardly to a cylindrical web 36, with the web 36 being bonded to the wheel disc 16, as by welds. This remaining portion of the wheel rim, from the draw bead step 32 to the cylindrical web 36, is substantially rigid and flex free.

The wheel cover 10 is illustrated, in an exemplary manner, as being molded in one piece construction of a conventional thermoplastic and comprises a dish shaped wheel cover body 40 having conventional vent openings which are not illustrated. The wheel cover 10 is mounted to the wheel 14 utilizing a conventional retention system such as an axial wheel cover retention system 38 illustrated in U.S. Pat. No. 4,998,780, incorporated herein by reference. The wheel cover body 40 includes a circular peripheral edge 42 which overlies the peripheral lip 24 of the wheel rim 18 when the wheel cover is mounted to the wheel 14 as illustrated in FIG. 1.

In accordance with the invention, the positioning system 12 includes a plurality of standoff legs 46 which are integrally molded with the wheel cover and project axially toward the wheel 14 from an inner face 48 of the wheel cover. The standoff legs 46 are equidistantly positioned about a circle which is coaxial with an axis 45 of the wheel and the wheel cover and having a radius designated by the reference numeral 44 in FIG. 1.

Each standoff leg 46 comprises an elongate trunk 50 having a pair of planar sides, 52, 54. An elongate axial rib 56 projects from the side 52 while an elongate axial rib 58 projects from the side 54. The ribs 56, 58 serve to rigidify the standoff leg 46 against both lateral and radial deflection.

It should be additionally noted that the trunk 50 includes a substantially straight radially inner edge 60 and an opposed, substantially straight radially outer edge 62.

The standoff leg 46 is configured with a sloped distal end 64 which is contoured to mate with the surface of the wheel rim hub 34, against which it abuts. Rounded corners may be provided at the junctures between the distal end 64 and the edges 60, 62 of the trunk 50.

From an examination of FIG. 1, it will be additionally noted that the standoff leg 46 may be dimensioned and positioned to assure that the radially inner edge 60 or the rounded corner end thereof is in abutment against an axially outwardly projecting portion of the wheel disc 16, so as to firmly seat the standoff leg 46 in its position and provide additional support against radial deflection which might otherwise be effected as a result of the sloped surface at the distal end 64 and the axial forces generated by the retention system.

The wheel cover 10 also includes a plurality of optional integrally molded positioning fingers 66 having a contoured distal lobe 68 which is configured to gently seat in the draw bead step 32 as an assembly guide to retain the wheel cover 10 in position while the retention system 38 is being engaged. Each finger 66 is radially registered with a standoff leg 46. The positioning fingers 66 do not provide retentive forces beyond those requisite for momentarily assuring that the wheel cover is held in place while the retention system components are being engaged.

Referring now to FIG. 4 wherein an alternate embodiment of the invention is disclosed, the same reference numerals employed in conjunction with the previous embodiment will be employed in conjunction with alternate embodiment, however, bearing the suffix "a". In the alternate embodiment, a wheel cover 10a having a positioning system 12a for assuring adequate clearance between the wheel cover and a peripheral edge 24a of a wheel rim 18a is disclosed. The wheel rim 18a surrounds a central disc 16a of a wheel 14a, in a manner identical to the wheel 14 previously described.

The embodiment of FIG. 4 differs from the embodiment previously described in that the standoff legs 46 are positioned about a circle having a larger radius than the radius 44 of the prior embodiment such that a radially inner edge 60a of the standoff leg 46a does not abut the central disc 16a. In all other aspects, the embodiment of FIG. 4 is identical to the embodiment previously disclosed.

It is significant that the axial length of the standoff legs is selected such that adequate clearance is provided between the inner face 48 of the wheel cover and the peripheral edge lip 24 of the wheel rim 18 over the axial tolerance limits of wheels specified for the particular vehicular application to which the wheel cover 10 is to be mounted.

It should also be noted that the wheel cover positioning system 12 of the present invention need not be molded of one piece construction with a plastic wheel cover. It is equally well suited for wheel covers other than molded plastic wheel covers and may be mounted, for example, as separate components to a metal wheel cover, or separately mounted to a plastic wheel cover.

Thus it will be seen that there is provided a wheel cover positioning system which achieves the various aspects, features and considerations of the present invention and which is well suited to meet the conditions of practical usage.

As various possible further embodiments might be made of the present invention and as various changes might be made in the illustrative embodiments above set forth without departing from the spirit of the invention, it is to be understood that all matter herein described or shown in accompanying drawings is to be interpreted as illustrative and not in a limiting sense.

Having thus described the invention there is claimed as new and desired to be secured by Letters Patent:

1. A positioning system for a wheel cover mounted to a wheel having a rim and a central disc, the rim including a seat for carrying a tire, the rim seat being subject to flex during usage, the rim seat being defined by a peripheral edge of the rim and an annular draw bead step, the wheel cover being mounted to the wheel with a portion of the wheel cover axially overlying the peripheral edge of the rim, the positioning system comprising a plurality of standoff legs, the legs projecting from the wheel cover axially toward the wheel, the legs being equidistantly spaced about a circle having a center coaxial with a center of the wheel cover, each leg having a distal end, the circle having a radius dimensioned for axial abutting contact between the distal end of each leg and the wheel rim at a flex free zone of the rim spaced axially and radially inwardly of the draw bead step and for abutting lateral contact between each leg and the central disc of the wheel, the legs having an axial length sufficient to assure clearance between the peripheral edge of the rim and the portion of the wheel cover axially overlying the peripheral edge of the wheel rim, whereby rubbing contact between the wheel cover and the peripheral edge of the wheel rim is precluded during flexing of the rim seat.

2. A positioning system for a wheel cover as constructed in accordance with claim 1 wherein the flex free zone is sloped, the distal end of each leg being correspondingly sloped.

3. A positioning system for a wheel cover as constructed in accordance with claim 2 wherein the flex free zone is sloped axially and radially inwardly.

4. A positioning system for a wheel cover as constructed in accordance with claim 2 wherein each leg further includes longitudinal edges, the longitudinal edges terminating at the sloped end, each leg having rounded corners at the junctures between the sloped end and the longitudinal edges.

5. A positioning system for a wheel cover as constructed in accordance with claim 1 wherein each leg includes a trunk having parallel planar sides.

6. A positioning system for a wheel cover as constructed in accordance with claim 5 wherein each leg includes an axial rib, the axial rib extending from one of the planar sides.

7. A positioning system for a wheel cover as constructed in accordance with claim 6 further including an axial rib extending from the other planar side.

8. A positioning system for a wheel cover as constructed in accordance with claim 1 wherein the wheel cover further includes a plurality of axial assembly fingers, each finger including a lobe for radial engagement with the annular draw bead step, each leg being spaced radially inwardly of an assembly finger.

9. A positioning system for a wheel cover as constructed in accordance with claim 8 wherein each leg is radially registered with a corresponding assembly finger.

10. A positioning system for a wheel cover as constructed in accordance with claim 1 wherein the wheel cover further includes an axial retention system.

11. A method of mounting a wheel cover having an axial retention system on a wheel having a wheel rim with a flex free portion, the wheel also having a central disc, a portion of the wheel cover axially overlying a peripheral lip of the wheel rim when the wheel cover is mounted, the method comprising the steps of:

(a) providing a plurality of standoff legs having axial ends projecting from an inner face of the wheel cover;

(b) dimensioning the wheel cover and standoff legs such that the axial distance between the peripheral lip of the wheel rim and the flex free portion of the wheel rim is less than the axial distance between the axial ends of the standoff legs and the portion of the wheel cover overlying the peripheral edge of the wheel rim;

(c) registering the standoff legs with the flex free portion of the wheel rim by axially registering the wheel cover with the wheel;

(d) placing the ends of the standoff legs in axial abutting contact with the flex free zone of the wheel rim and in radial abutting contact with the central disc by moving the wheel cover axially toward the wheel; and (e) engaging the axial retention system.

12. A dressed wheel assembly comprising a wheel and a wheel cover, the wheel having a rim and a central disc, the rim including a seat for carrying a tire, the rim seat being subject to flex during usage, the rim seat being defined by a peripheral edge of the rim and an annular draw bead step, the wheel cover including an axial wheel cover retention system, the wheel cover being mounted to the wheel with a portion of the wheel cover axially overlying the peripheral edge of the rim, the wheel cover further including a positioning system, the positioning system comprising a plurality of standoff legs, the legs projecting from the wheel cover axially toward the wheel, each leg having a distal end in abutting axial contact with flex free zone of the wheel rim spaced radially inwardly of the draw bead step, the positioning system further including a plurality of axial assembly fingers for positioning the wheel cover while mounting the wheel cover to the wheel, each finger including a lobe in radial engagement with the draw bead step, each finger being radially registered with a standoff leg, each standoff leg having an axial length sufficient to assure clearance between the peripheral edge of the rim and the portion of the wheel cover axially overlying the peripheral edge of the wheel rim, whereby the wheel cover is held in place by the assembly fingers while the axial retention system is being engaged and rubbing contact between the wheel cover and the peripheral edge of the wheel rim is precluded during flexing of the rim seat.

13. A dressed wheel assembly as constructed in accordance with claim 12 wherein the flex free zone is sloped, the distal end of each leg being correspondingly sloped.

14. A dressed wheel assembly as constructed in accordance with claim 13 wherein the flex free zone is sloped axially and radially inwardly.

15. A dressed wheel assembly as constructed in accordance with claim 14 wherein each leg further includes longitudinal edges, the longitudinal edges terminating at the sloped end, each leg having rounded corners at the juncture between the sloped end and the longitudinal edges.

16. A dressed wheel assembly as constructed in accordance with claim 12 wherein each leg includes a trunk having parallel planar sides.

17. A dressed wheel assembly as constructed in accordance with claim 16 wherein each leg includes an axial rib, the axial rib extending from one of the planar sides.

18. A dressed wheel assembly as constructed in accordance with claim 17 further including an axial rib extending from the other planar side.

19. A dressed wheel assembly as constructed in accordance with claim 12 wherein the standoff legs and the assembly fingers are integrally formed with the wheel cover, the wheel cover being molded of one piece construction.

* * * * *